March 31, 1959 — G. P. REINTJES — 2,879,660
ADJUSTABLE LINING SUPPORT
Filed April 25, 1955 — 4 Sheets-Sheet 1
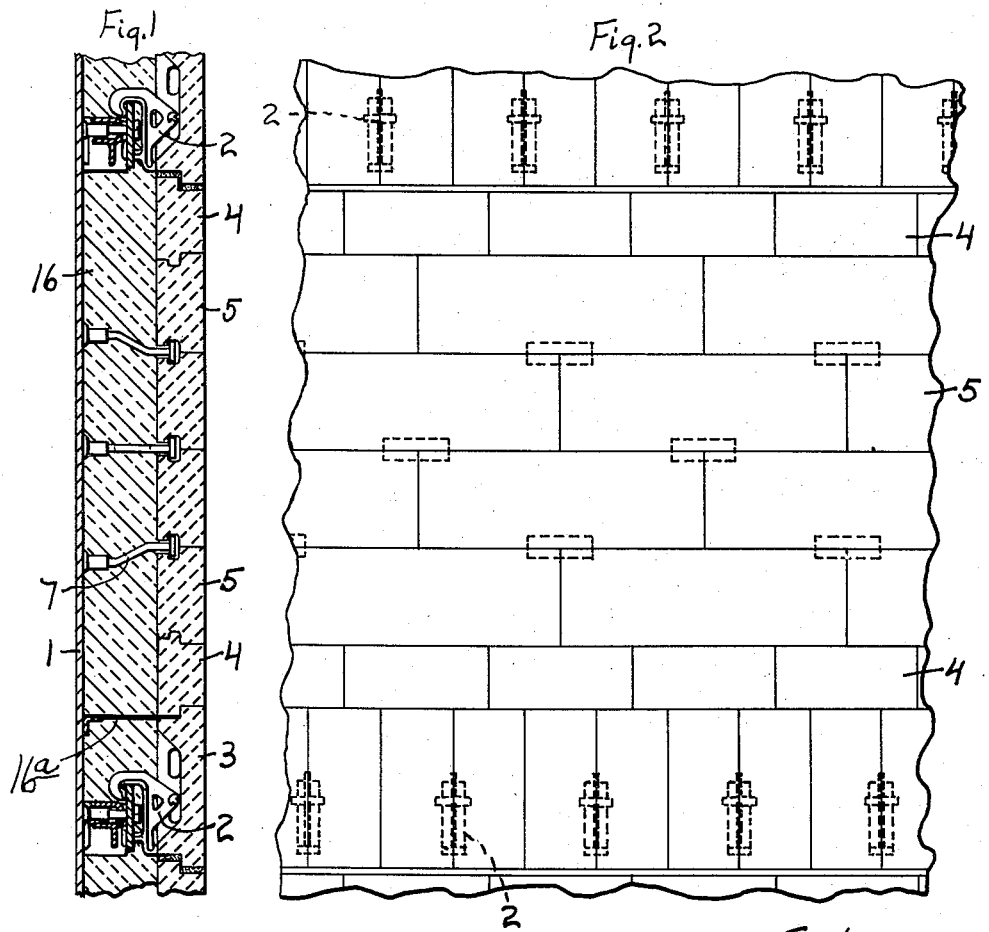
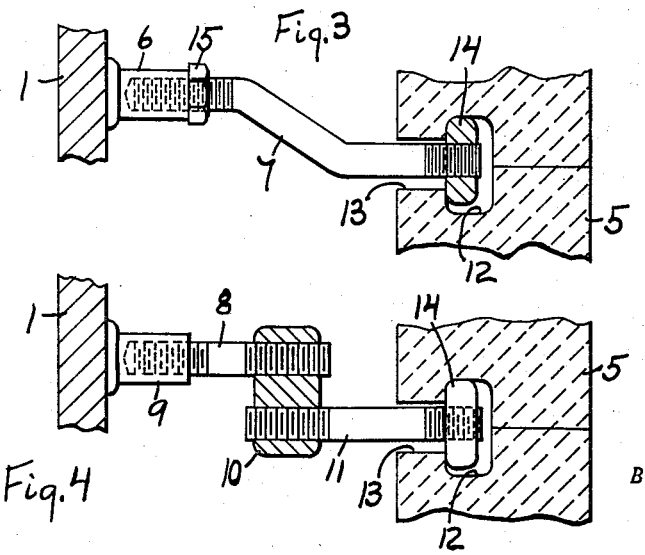
INVENTOR.
George P. Reintjes
BY Kenneth M. Thorpe
atty.

March 31, 1959  G. P. REINTJES  2,879,660
ADJUSTABLE LINING SUPPORT
Filed April 25, 1955  4 Sheets-Sheet 2
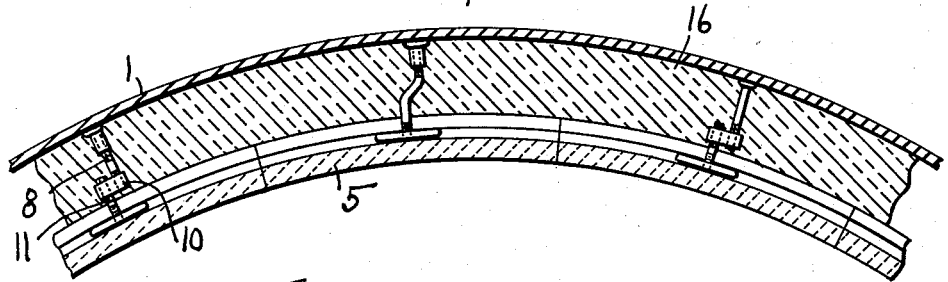
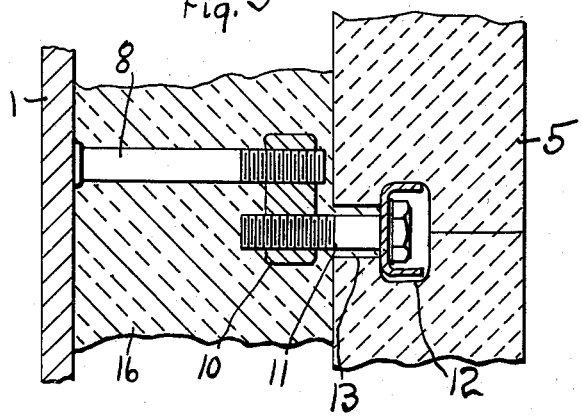
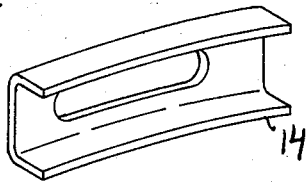
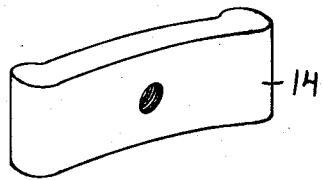
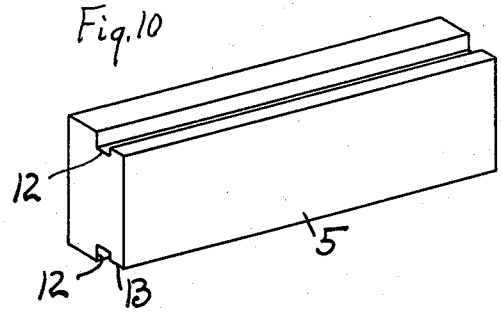
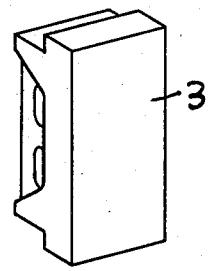
INVENTOR.
BY George P. Reintjes
Kenneth M. Thorpe
atty.

March 31, 1959 G. P. REINTJES 2,879,660
ADJUSTABLE LINING SUPPORT
Filed April 25, 1955 4 Sheets-Sheet 3
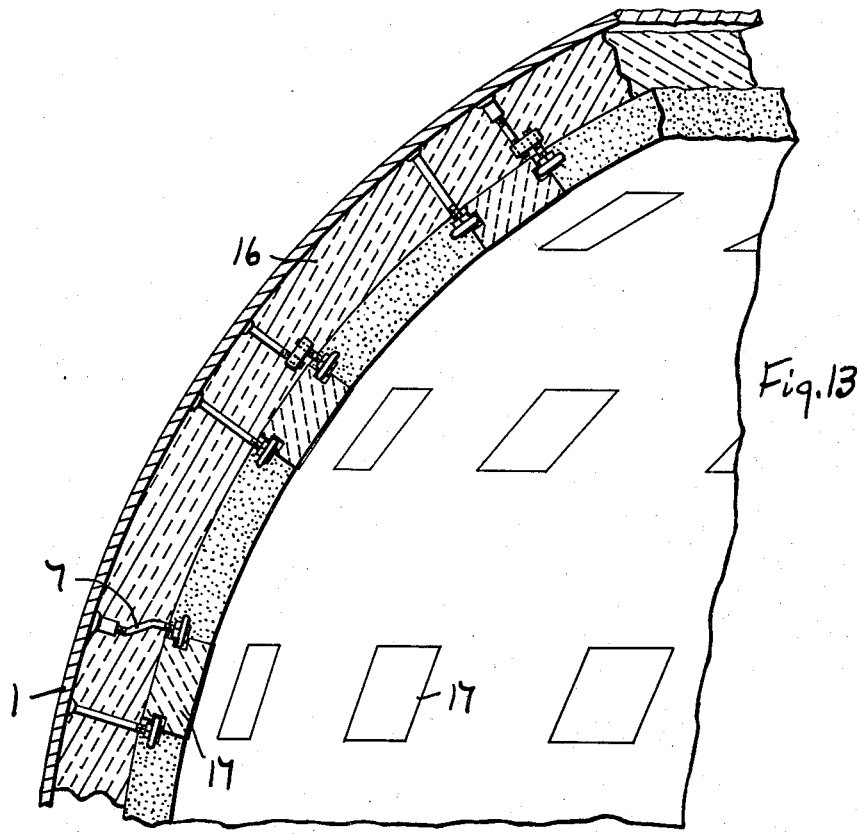
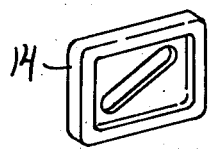
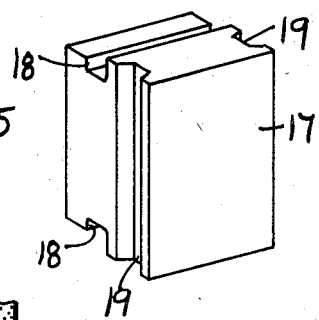
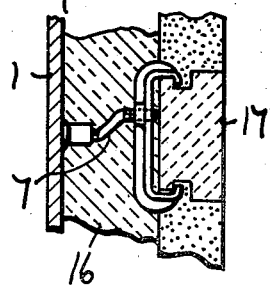
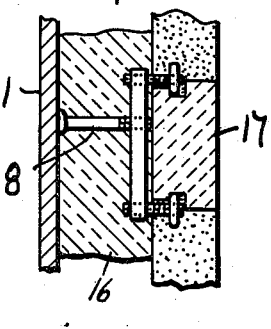
INVENTOR.
BY George P. Reintjes
Kenneth M. Thorpe
atty.

March 31, 1959 G. P. REINTJES 2,879,660
ADJUSTABLE LINING SUPPORT
Filed April 25, 1955 4 Sheets-Sheet 4

INVENTOR.
George P. Reintjes
BY Kenneth M. Thorpe
atty.

United States Patent Office 2,879,660
Patented Mar. 31, 1959

2,879,660

ADJUSTABLE LINING SUPPORT

George P. Reintjes, Kansas City, Mo.

Application April 25, 1955, Serial No. 503,577

2 Claims. (Cl. 72—19)

This invention relates to supporting means for tile, metal or other preformed units to be secured as a liner, surface finish or protection to the walls of a vessel, chamber or conduit. The material used for the lining may be tile, refractory or metal, depending on the temperatures, pressure conditions and erosive properties of the gases or fluids flowing through the chamber.

One of the chief objects of the invention is to provide a support projecting from the shell or framework of the vessel to be lined, which is adjustable to accommodate misplacement of the support on the shell and/or variations in the dimensions of the lining elements due to manufacturing tolerances.

A further object of the invention is to produce a support of the character described which may be used both as a support for the lining elements in a wall, dome or roof, and is also useful to tie the lining elements against falling away from the shell in those constructions where the liner weight is carried by an underlying support shelf or belt.

With the general objects named in view and others as will hereinafter appear, the invention consists in certain new and useful features of construction and organization of parts as hereinafter described and claimed; and in order that the invention may be fully understood, reference is to be had to the accompanying drawings, in which:

Figure 1 is a vertical section through a shell provided with a liner embodying the invention.

Figure 2 is a face view of the liner as shown in Figure 1.

Figures 3, 4 and 5 are respectively enlarged sections through modified constructions, showing how the inner end of the supporting member is mounted so that it can be swung concentrically around the center of support of the outer end to the shell.

Figures 6 and 7 respectively illustrate the concentric rotation of the inner end of the securing member to provide a range of adjustment equal to the diameter of the circle.

Figures 8 and 9 illustrate two types of locks or keys for engagement with the liner.

Figure 10 is a perspective view from the rear face of a standard filler tile liner.

Figure 11 is a perspective view of a support or shelf tile.

Figure 12 is a section through an arch or similar construction provided with a lining embodying the invention.

Figure 13 is a fragmental view of a dome equipped with spaced tile mounted as described herein to act as keys to retain a plastic liner in position.

Figure 14 is a perspective view of one type of lock plate.

Figure 15 is a perspective view of a tile such as used in lining the dome of Figure 13, said tile having grooved side edges to interlock or key with the plastic material.

Figure 16 is a section through a modified form of construction used to secure liners in position without an auxiliary support, said support being of C-shape.

Figure 17 is a modified construction similar to that of Figure 16 in which a straight bolt is used with an adjustable plate and a pair of plate interlocks.

Figure 18:
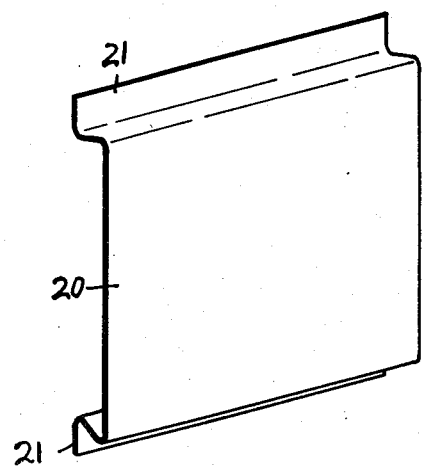

Figure 18 is a perspective view of one type of metal liner plate.

Figure 19:
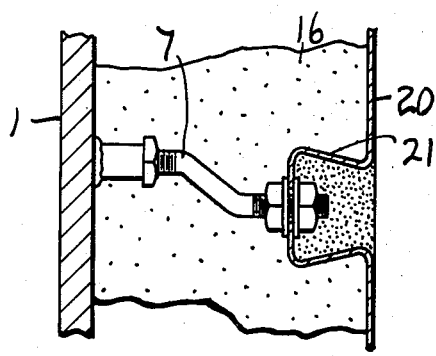
Figure 20:
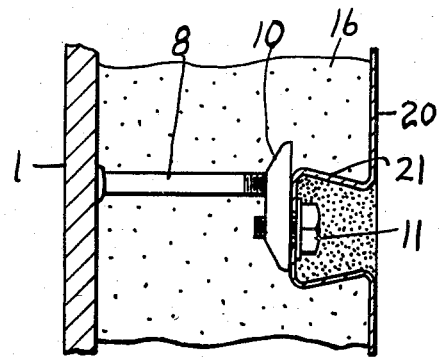

Figures 19 and 20 are cross sections through the metal liner plate with the supports of Figures 3 and 4.

Figure 21:
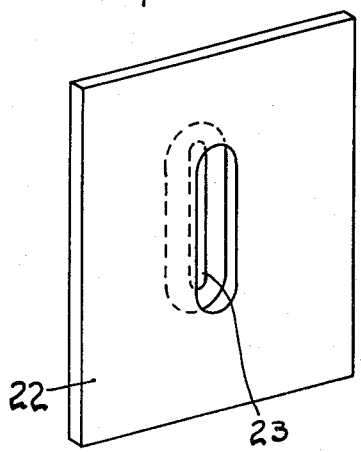

Figure 21 is a substitute form of cast metal liner plate.

Figure 22:
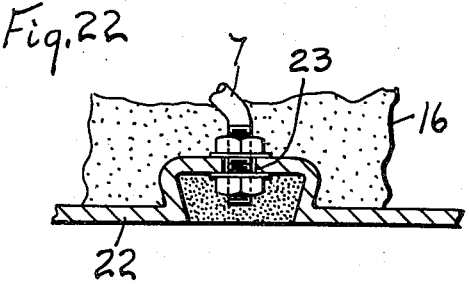

Figure 22 is a section through the plate of Figure 21 with a support in operative position.

In the said drawings, where like reference characters identify corresponding parts in all of the figures, 1 is a framework or shell of a vessel or chamber. In general, the lining may be applied in two methods, (a) by securing to the shell in vertically spaced relation a series of shelves or supporting courses which carry a plurality of overlying courses of liners tied back to the shell to prevent them from falling from position, and (b) a construction in which the liners are both gravitatively supported and tied back to the shell by the same supporting elements. In the present application both types of securing methods are shown.

For convenience the construction mentioned in (a) will be first described. Considering Figures 1 and 2, 1 is the shell or framework and secured thereto in vertically spaced relation are a series of demountable hangers 2, which carry horizontal rows of shelf tile 3. By preference, the upper and lower edges of the tile 3 are offset to provide for interlocking with the lower and upper edges respectively, of transition tile 4. Gravitatively supported on the lower tile 4 of each belt or course are a plurality of liner tile 5, said liner tile being relatively thin and although their weight is largely carried by the shelf tile 3, the rows of liner tile must be tied back to the shell 1 to prevent the tile from falling from position.

Heretofore various type of securing means have been employed in the endeavor to tie back the lining tile to the shell, but these constructions have not been successful since it has not been found practicable to exactly predetermine the point of attachment of the securing means to the shell and also variations in manufacturing tolerances of the liner elements makes an exact correlation of parts impossible. As a means of compensating for these two variables various steps have been taken to allow for a range of adjustment within the tile. The present invention, however, provides means for allowing a range of adjustment that is entirely outside of the body of the liner itself, namely, in the space between the outer face of the liner and the inner face of the shell or support. In order to provide an adjustable tie of the character described, I have provided a securing means having its outer end attached to the shell and its inner end concentrically adjustable around the outer or attached end, such rotative adjustment occurring in the space between the liner and shell. With such a construction it will be apparent that the inner end will have a range of adjustment equal to the diameter of the circle of rotation.

In the present application I illustrate two fundamental variations as shown in Figures 3 and 4, each of which are subject to variations. In Figure 3, a threaded nut or sleeve 6 is welded or otherwise secured to the shell 1, and screwed therein is one end of a bolt 7 which is bent to form a crank so that the inner end of the bolt may be adjusted in a circle as shown in Figure 6 by rotation of the bolt 7 in its nut 6. In Figure 4 a straight bolt 8 may be threaded in a nut 9 (or the bolt may be permanently welded to the shell as shown in Figure 5), and said bolt at its inner end carries a clip or casting 10 which is provided with connecting means for receiving a second bolt 11. By rotating the casting 10 on the bolt 8, the end of the bolt 11 may be adjusted in a circle as shown in Figure 7.

In the construction shown in Figures 1 and 2, the liner tile 5 are preferably of generally rectangular shape in face view but may be bowed in edge view to fit the contour of the vessel surface, and have a pair of their side edges, upper and lower in the construction shown, formed with a pair of grooves 12 spaced between the inner and outer faces of the tile, the edge of the tile rearward of the groove forming a securing flange and being recessed or stepped back at 13 to accommodate the inner end of the wall tie-in member or support. The first course of liner 5 interlocks with the upper face of the transition tile 4, the upper groove of said tie receiving a locking plate 14 secured to the end of the bolt and received within the tile groove. The lock plate 14 may take various shapes such as shown in Figures 3, 4, 8 and 9. It will be evident that in the erection of the filler tile, the vertical adjustable character of the support not only accommodates variations in dimensions and location, but also makes it possible to lay the tile horizontally without endwise threading movement, since the bolt can be rotated upwardly out of the way while the tile is being placed and then it is swung downwardly so that the locking plate 14 enters the groove.

With the construction above described it will be apparent that the edge grooves lock the tile against both movement inwardly and outwardly in relation to the shell, the gravitative weight being supported largely by the shelf tile. If desired, the space between the shell and tile may be filled or packed with block or plastic insulation 16. To prevent vertical undercutting of the insulation vapor seal plates 16a may project from the shell into the refractory liner at desired elevations.

A construction similar to that above described may be used to line a roof, dome, arch or floor, as shown in Figure 12. In this construction it will be evident that the rear flange of the groove in the edge of the tile also supports the liner against gravitative movement downwardly or upwardly depending upon whether in a roof or floor. Of course a similar construction can be used in lining a wall, vertical or inclined where it is not desired to employ the underlying shelves.

A combination liner of tile and plastic is shown in Figure 13, as applied to a dome or arch. In this construction the tile 17 are preferably of the configuration shown in Figure 15, said tile having a pair of its edges formed with the supporting grooves 18, while its other edges are provided with grooves 19 to act as keys to engage the plastic lining applied between the tile 17 by trowelling or by pneumatic placement.

Figures 16 and 17 illustrate a modified C-type of securing means for engagement with the grooves in the edges of the tile or other lining members.

In Figures 18 through 20, the liner is shown of metal plate or sheet form 20, having a pair of their opposite edges offset rearwardly at 21 so that when a pair of plates are in contiguous relation a groove is provided to receive a plastic sealer. This sealer covers the securing bolts and provides a smooth external surface.

In Figure 21 the liner is shown as a cast plate 22 provided with a central depressed area having a through opening at 23, the depressed area around the opening forming a securing flange to engage the attaching means. The securing bolt will be rotatively adjusted to pass through said slot.

From the above description and drawings, it will be apparent that I have produced a construction embodying all of the features of advantage set forth as desirable, and while I have described and illustrated the preferred embodiment it is to be understood that I reserve the right to all changes within the spirit and scope of the appended claims.

I claim:

1. In a lining, a supporting frame, a multiple tile lining paralleling one side of the frame, said tile being in edgewise abutment, predetermined abutting tile having mating grooves in selected abutting edges, said grooves being spaced intermediate the front and rear faces of the tile and extending for the full length of the tile, the edge faces of the tile between the grooves and the rear face of the tile being offset inwardly for the full length of the tile to form a recess opening through the rear face of the tile into the grooves, a threaded on bolt projecting perpendicularly from the frame toward the lining, a clip threaded on the inner end of the bolt for rotative adjustment around the bolt and movement toward and from the frame, said clip having a second threaded opening eccentric to the bolt, a second bolt threaded in the second opening in the clip for adjustment toward and from the frame, the inner end of the second bolt projecting into the tile recess, and a lock plate carried by the end of said second bolt and received in the tile grooves.

2. In a lining, a supporting frame, a multiple tile lining paralleling one side of the frame, said tile being in abutting relation, predetermined abutting tile having mating grooves in selected abutting edges, said grooves being accessible from the tile face adjacent the frame and extending for the full length of the tile and being spaced intermediate the two faces of the tile, a threaded bolt carried by and projecting perpendicularly therefrom toward the lining, a clip threaded on said bolt for rotative adjustment and movement toward and from the frame, said clip having a second threaded opening eccentric to the bolt, a second bolt threaded in the second opening in the clip for adjustment toward and from the frame, and a locking plate carried by the second bolt, said locking plate having both rotative and longitudinal adjustment relative to the axis of the first bolt.

References Cited in the file of this patent

UNITED STATES PATENTS

| | | |
|---|---|---|
| 325,009 | Peterson | Aug. 25, 1885 |
| 1,052,670 | La Francis | Feb. 11, 1913 |
| 1,197,842 | Meier | Sept. 12, 1916 |
| 1,800,244 | Blum | Apr. 14, 1931 |
| 1,916,634 | Pajeau | July 4, 1933 |
| 2,257,598 | Frease | Sept. 30, 1941 |
| 2,304,333 | Bossi | Dec. 8, 1942 |
| 2,323,661 | Hosbein | July 6, 1943 |
| 2,439,624 | Irwin | Apr. 13, 1948 |
| 2,705,414 | Rose | Apr. 5, 1955 |

FOREIGN PATENTS

| | | |
|---|---|---|
| 136,372 | Great Britain | Dec. 18, 1919 |